US007367442B2

(12) United States Patent
von Freden

(10) Patent No.: US 7,367,442 B2
(45) Date of Patent: May 6, 2008

(54) DEVICE FOR TRANSFERRING CONTINUOUSLY TRANSPORTED PRINTING PRODUCTS FROM A FLAT LYING POSITION INTO AN UPRIGHT POSITION OR VICE VERSA

(75) Inventor: Christoph von Freden, Schwaförden (DE)

(73) Assignee: Kolbus GmbH & Co. KG, Rahden (DE)

( * ) Notice: Subject to any disclaimer, the term of this patent is extended or adjusted under 35 U.S.C. 154(b) by 0 days.

(21) Appl. No.: 11/402,353

(22) Filed: Apr. 12, 2006

(65) Prior Publication Data

US 2006/0231372 A1 Oct. 19, 2006

(30) Foreign Application Priority Data

Apr. 14, 2005 (DE) ..................... 10 2005 017 159

(51) Int. Cl.
*B65G 47/24* (2006.01)

(52) U.S. Cl. ...................................... 198/417; 198/406

(58) Field of Classification Search ................ 198/405, 198/406, 417, 603, 729

See application file for complete search history.

(56) References Cited

U.S. PATENT DOCUMENTS 4,371,156 A * 2/1983 Pessina et al. ........... 270/58.29
4,411,350 A * 10/1983 Wolfram ................... 193/35 A
4,471,865 A * 9/1984 Johnson ...................... 198/408
4,569,620 A * 2/1986 Lynch ......................... 412/21
4,583,632 A * 4/1986 Lyyra ......................... 198/407
4,787,499 A * 11/1988 Lodi et al. .................. 198/407
6,196,377 B1 * 3/2001 Brown ....................... 198/839
6,257,824 B1 * 7/2001 Selm et al. ................. 414/754
6,409,008 B1 * 6/2002 Newsome ................... 198/403
7,036,654 B2 * 5/2006 Frost .......................... 198/406

FOREIGN PATENT DOCUMENTS

DE 35 711 1/1965
DE 29 43 260 A1 5/1981
DE 30 06 266 A1 9/1981

* cited by examiner

*Primary Examiner*—Douglas A Hess
(74) *Attorney, Agent, or Firm*—Alix, Yale & Ristas, LLP

(57) ABSTRACT

A device (1) for transferring continuously transported printing products (2 *a . . . g*), e.g., book blocks, books or sheet stacks consisting of folded and/or non-folded sheets, from an essentially flat lying position into an upright position or vice versa by a conveyor (3) that is twisted about a longitudinal axis (9). A first transporter (3) with pushers (4) advances the printing products (2 *c . . . f*) during the transfer, and a second transporter (10 or 12) has support elements (11), on which the printing products (2 *c . . . f*) are at least partially supported or lie with their primary surface during the transfer. The invention allows a particularly careful transport of sensitive individual parts or partial products that may even consist of thin individual sheets on the bottom side. A narrow line of support provided by the support elements (11) suffices for this purpose, wherein this narrow line of support essentially acts upon the product (2*c . . . f*) in one line of action with the respective pusher (4).

15 Claims, 3 Drawing Sheets

1
3
4
9
10
11
12
17
18a
18b
18c
19
20a
20b
20c
21
22
23a
23b
23c
24
25

1
2a
2b
2c
2d
2e
2f
2g
2'
2''
2'''
3
4
5
6
9
10
11
12
14
15
16
17
18a,b,c
19
20a,b,c
22
24
26
27
$V_1$
$V_2$
$V_3$
$V_4$

DEVICE FOR TRANSFERRING CONTINUOUSLY TRANSPORTED PRINTING PRODUCTS FROM A FLAT LYING POSITION INTO AN UPRIGHT POSITION OR VICE VERSA

BACKGROUND OF THE INVENTION

The present invention pertains to a device for transferring continuously transported printing products, e.g., book blocks, books or sheet stacks consisting of folded and/or non-folded sheets, from an essentially flat lying position into an upright position or vice versa by means of a conveyor that is twisted about a longitudinal axis.

Transfers of the aforementioned type take place at various points in the process chain for manufacturing books. For example, the sheet stacks formed from loosely gathered folded sheets on a gathering conveyor of a gathering machine are transferred from their essentially flat lying position into an upright position with the spine pointing downward such that they can be delivered to the infeed system of an adhesive binder. With continuously transported printing products, the uprighting takes place at the delivery end of the gathering conveyor that is composed of a transport channel and a transport chain with pushers that advance the sheet stacks on the transport channel, wherein the transport channel with its channel side plates is progressively twisted about a longitudinal axis in order to upright the sheet stacks. In the uprighting region, the transport channel consists of pattern-rolled channel side plates with air blast nozzles recessed therein. Despite these measures for minimizing the friction in the uprighting channel, the bottom sheets lying on the channel side plates may still shift relative to the sheets of the stack lying thereon, particularly when processing individual sheets or extremely thin paper types.

DE 29 43 260 A1 discloses a device for transferring books from a vertically standing position into a horizontally lying position by utilizing two perpendicularly arranged roller conveyors with rotatively driven rollers, wherein each roller conveyor is twisted about a longitudinal axis. Steadying rods extend parallel to and are spaced apart from the vertically standing rollers of one roller conveyor, namely from the delivery end of the roller conveyor up to the transition region of the rollers from the vertical position into the horizontal position, so as to prevent the books being delivered from opening before they are laid down. There also exist lying-down devices with two driven plate chain conveyors that are arranged perpendicular to one another and respectively twisted by 90° along a longitudinal axis. The individual transport rollers and support plates of these two known lying-down devices respectively provide the products to be transferred with a linear support surface that is oriented transverse to the transport direction. Due to the respectively twisted arrangement of the transport rollers and support plates, printing products, particularly less flexible printing products, only lie partially on the transport means. The thusly caused transport conditions are associated with a certain slip and do not allow a positionally accurate and cyclically synchronous transport, particularly during start-up and stopping processes, such that an additional cyclic infeed of the books into downstream machines is required. In addition, the transport devices are only suitable for the uprighting of products to a limited degree. In the device known from DE 29 43 260 A1, a certain flexing effect of sheets that are loosely stacked on top of one another can also be observed. This means that lower sheets may shift rearward relative to sheets lying thereon.

It is also known to realize the lying down and uprighting by means of twisted clamping belt conveyors with belts that are respectively placed around two deflection rollers and jointly twisted by 90° between the deflection rollers. DE 30 06 266 A1 discloses a clamping belt conveyor that is twisted by 180° and used as a turning device for reversing continuously transported printing products by 180°. These known clamping belt conveyors have a complicated design because several different types of guide means are required for achieving a satisfactory guidance of the twisted transport belts. In addition, and is impossible to prevent relative movements between the transport belts that, in turn, cause the sheets in the stack or the individual parts of freshly bound book blocks to shift.

SUMMARY OF THE INVENTION

The present invention is based on the objective of developing a device for transferring printing products of the initially cited type which ensures an exceptionally careful handling of the printing products as well as a cyclically synchronous transfer with high cycle rates.

The inventive idea can be seen in that the printing products are advanced by pushers during the transfer and at least partially lie on an additional transport means during this process. The second transport means prevents printing products that are advanced in an eccentric fashion from turning away in front of the pusher. The partial product or the individual part of the printing product that lies on the bottom is reliably advanced by the second conveyor. A relative displacement no longer takes place because it was possible to reduce the frictional force acting opposite to the transport direction to a minimum.

The invention allows a particularly careful transport of printing products consisting of sensitive individual parts or partial products that may even consist of thin individual sheets on the bottom side. It was determined that a narrow line of support provided by the support element already suffices for this purpose, wherein this narrow line of support essentially acts upon the printing product in one line of action with the respective pusher. The pushers ensure a cyclically synchronous transport such that the printing product can be handed over to a downstream processing machine, e.g., without requiring an additional cyclic infeed.

The device is suitable for a variety of printing products used in the paper converting and print converting industries and simultaneously allows high transfer rates. The device according to the invention may be designed for uprighting or for lying down printing products. It is characterized by a simple construction that can be integrated into upstream or downstream machines. For example, the first conveyor with the pushers may consist of a gathering chain of a gathering machine that is twisted on the outlet end.

BRIEF DESCRIPTION OF THE DRAWINGS

One embodiment of the invention is described in greater detail below with reference to the figures. The figures show.

DESCRIPTION OF THE PREFERRED EMBODIMENTS

Figure 1:
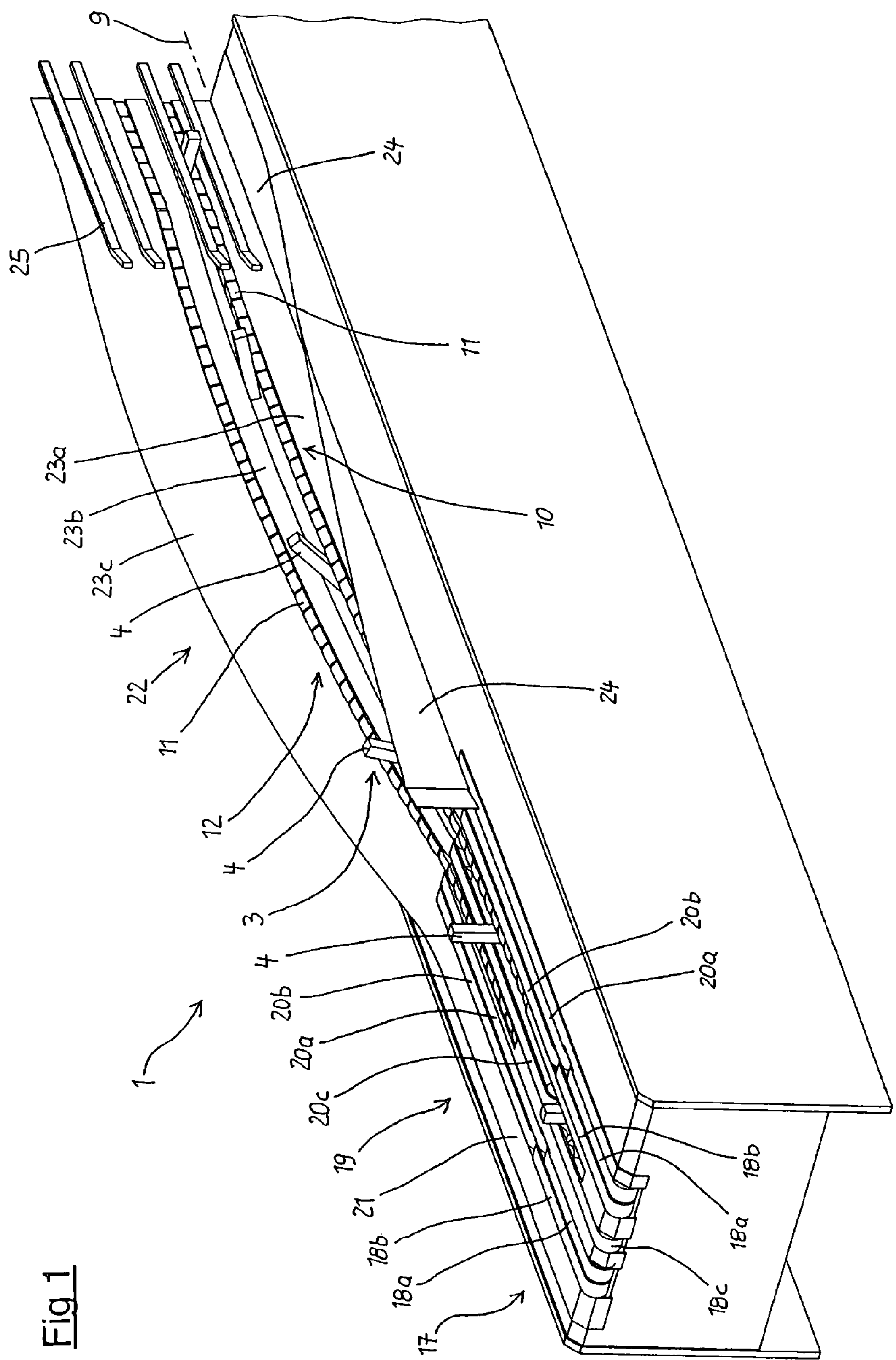
FIG. 1, a perspective representation of an uprighting device according to the invention.
Figure 2:
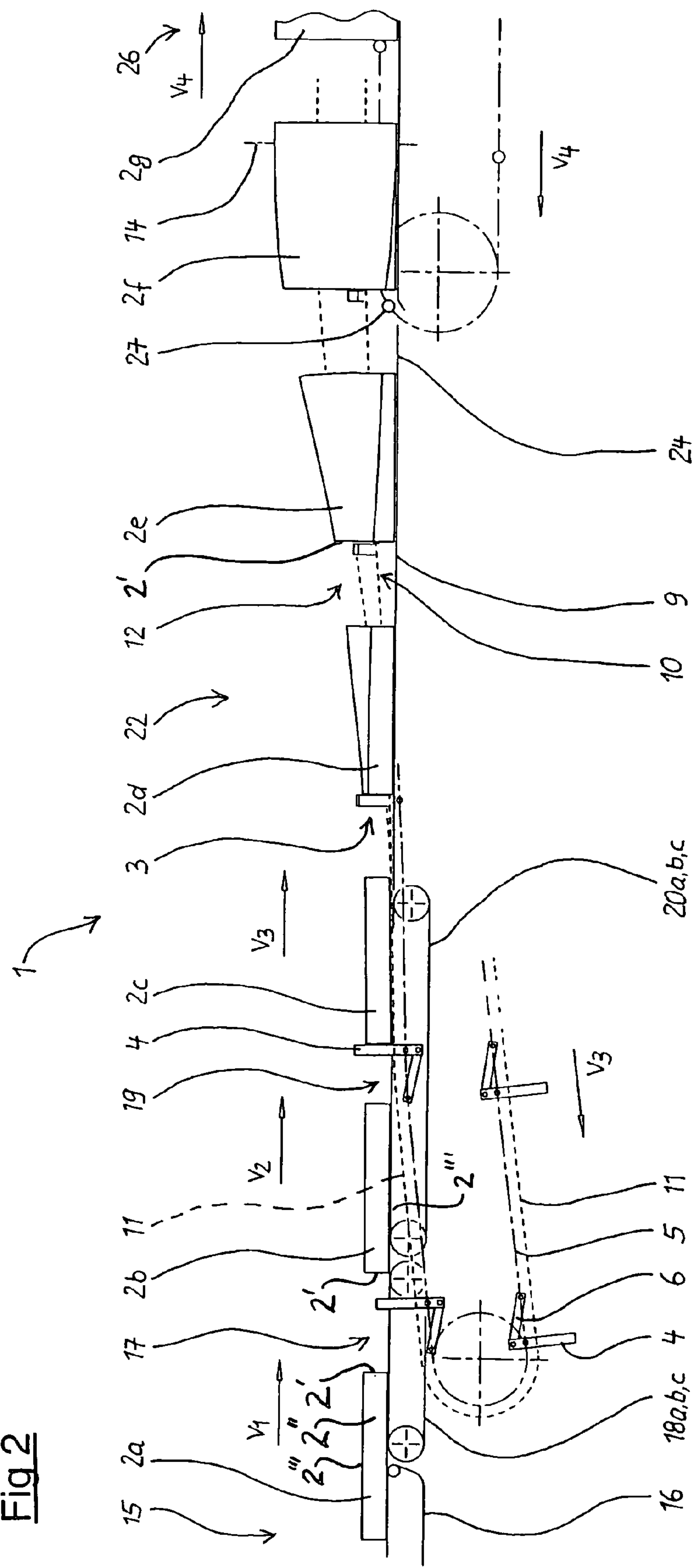
FIG. 2, a schematic side view of the uprighting device.
Figure 3:
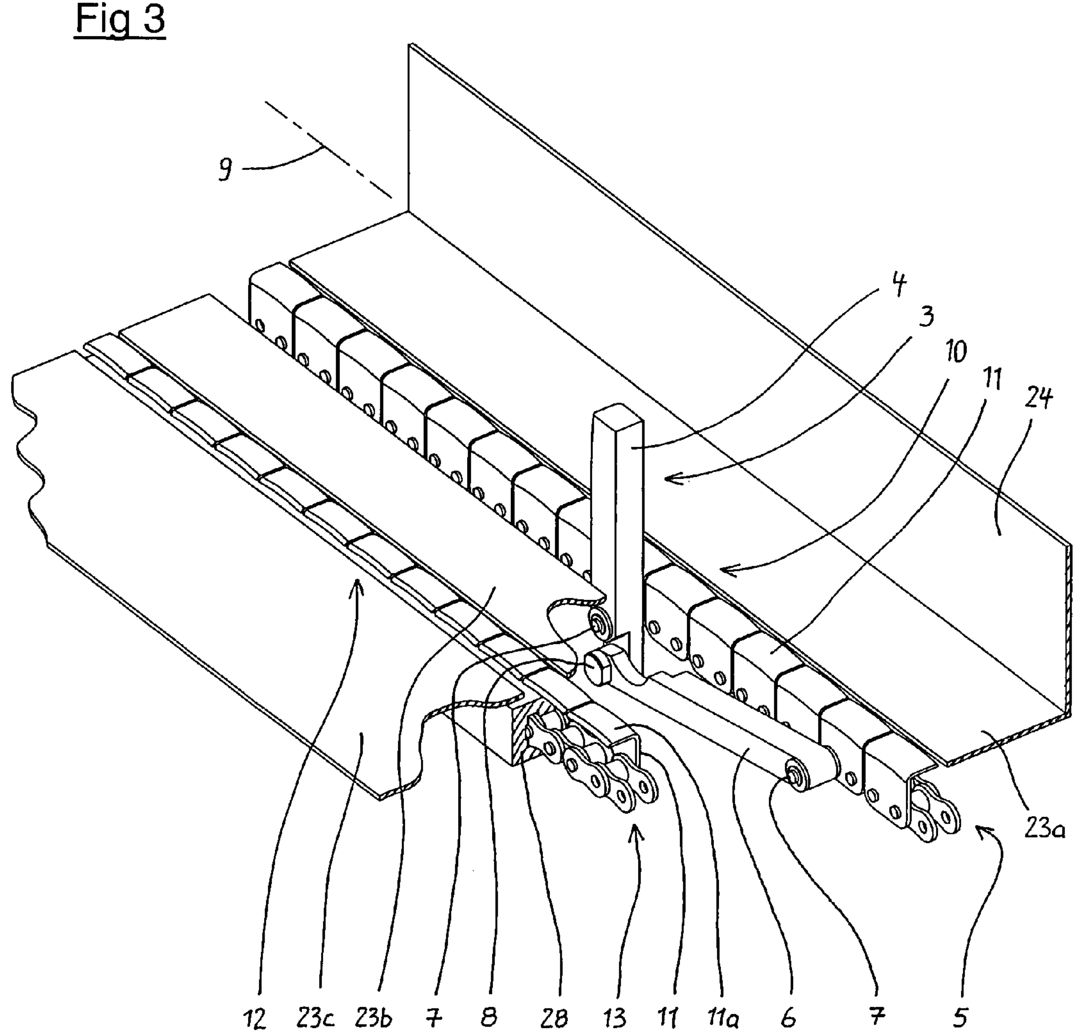
FIG. 3, a detailed perspective representation of the transport means of the uprighting device.

The uprighting device 1 shown in FIGS. 1 and 2 is designed for uprighting, for example, sheet stacks 2*a* . . . *g* that are composed of loose sheets and fed to the uprighting device 1 while flatly lying on a transport belt 16 of a feed conveyor 15 such that they are about equidistantly spaced apart from one another. For convenient reference, the sheet stack on belt 16 can be considered as having a head 2' and an opposite foot at the shorter edges, a front 2'' and opposite back at the longer edges, and top 2''' and opposed bottom primary surfaces or faces bordered by the four edges. The sheet stacks are received with a synchronous transport speed $v_1$ by a synchronous belt conveyor 17 that is composed of several adjacently arranged transport belts 18*a, b, c* as shown in FIG. 2 with reference to the sheet stack 2*a*. The individual transport belts 18*a, b, c* have different lengths and are followed by transport belts 20*a, b, c* of a downstream braking belt conveyor 19 that additionally transports the sheet stack 2*b* with a slower transport speed $v_2$.

The transport belts 18*a, b, c* and 20*a, b, c* are surrounded by a sliding plate 21 that contains openings for transport means that receive the sheet stack from the braking belt conveyor 19. A first transporter or conveyor 3 has pushers 4 that are equidistantly spaced apart from one another and emerge in a transport gap behind the foot 2' of the respective sheet stack 2*b*. The pushers reach and subsequently advance the sheet stack 2*c* due to their higher transport speed $v_3$.

In addition to the conveyor 3, a second transporter or conveyor 10 forms an endless row of support plates 11 adjacent to the pushers 4, wherein the sheet stacks 2*c* . . . *g* partially lie on the support plates with one of their primary surfaces 2'''. A third transporter or conveyor 12 with support plates 11 is arranged such that it is offset parallel to the conveyor 10 and thusly provides an additional line of support on the same primary surface for the sheet stacks 2*c* . . . *g* on the other sides of pusher 4.

The conveyors 10 and 12 with their support plates 11 transversely penetrate the transport plane of the braking belt conveyor 19 from the bottom and are guided such that they do not lift the sheet stack 2*b* off the transport belts 20*a, b, c* and the sliding plate 21 until the corresponding pusher 4 is already in contact with the sheet stack 2*b*.

At the end of the braking belt conveyor 19, the aforementioned conveyors 3, 10 and 12 transform into a twisted section, in which the conveyors are twisted by 90° along a longitudinal edge or axis 9. This creates a twisted uprighting section 22, in which the sheet stacks are transferred from their flat lying position into an upright position. Initially, the head and foot 2' and the primary faces 2''' are parallel horizontal, but they are then transferred to parallel vertical.

In order to additionally support the sheet stacks 2*d* . . . *f* to be uprighted, the uprighting section 22 comprises a sliding surface in the form of a support track that is composed of twisted support track plates 23*a, b, c* arranged adjacent to the conveyors 3, 10 and 12. The support track plates are set back relative to the support plates 11 such that the sheet stacks 2*d* . . . *f* are transported by the support plates 11. Another twisted support track plate 24 forms a second support track that extends perpendicular to the first support track and against which the sheet stacks 2*d* . . . *f* are initially placed with their back edges 2''. As the transfer into the upright position progresses, the sheet stacks 2*e, f* are supported at, e.g., the front from below, on the support track plate 24 while the face side 2''' of the sheet stacks is now only supported on the support plates 11 of the conveyors 10, 12 and, if applicable, the support track plates 23*a, b, c* such that the transport is essentially realized by the pushers 4 of the conveyor 3 acting at the head 2'.

At the outlet end of the uprighting section 22, guide rods 25 are arranged parallel to the vertical orientation of the support track 23 formed by the support track plates 23*a, b, c,* and horizontal orientation of the support plate 24. The guide rods prevent the uprighted sheet stack 2*f* from opening or falling over and guide the sheet stack 2*g* into the transport channel of a downstream discharge conveyor 26. This discharge conveyor 26 may form, for example, part of the infeed system of an adhesive binder, in which the sheet stacks are additionally processed into bound book blocks or brochures. It comprises pushers 27 that are arranged at a fixed distance from one another and receive the sheet stacks from the pushers 4 of the conveyor 3 with a higher speed $v_4$.

The first conveyor 3 comprises a transport chain 5 that is guided in guide rails 28 in accordance with the transport path of the uprighting device 1 in the form of a side bend chain, wherein the pushers 4 are laterally received on this transport chain in a rotatable fashion by means of extended chain bolts 7, and wherein each pusher 4 is controlled by an assigned connecting rod 6. The latter is rotatably connected to the driver 4 with one end and rotatably connected to the extended chain bolt 7 of the transport chain 5 with the other end.

The connecting rod lengths and lever lengths are configured such that the pushers 4 are always guided perpendicular to the transport plane during the transport of sheet stacks 2*c* . . . *f*. In order to realize a continuous reception by the pushers 27 of the discharge conveyor 26, the pushers 4 remain in a perpendicular position referred to the vertical transport plane in the region of the deflection about the deflection axis 14, in particular, at least until the pushers 4 disappear underneath this transport plane.

The second conveyor 10 is realized by providing the transport chain 5 with the aforementioned support plates 11, in the form of angled link plates. The first conveyor 3 and the second conveyor 10 that practically act upon the sheet stacks along one line of action are therefore inevitably driven in a synchronous fashion. In this context, line of action means that both forces act in the same direction, without applying a torque. The third conveyor 12 is formed by a separate transport chain 13 that is guided in the form of a side bend chain in guide rails 28 in accordance with the transport path of the uprighting device 1, namely such that it is offset parallel to the transport chain 5, wherein this third conveyor has a slightly longer transport path than the transport chain 5 due to the twist about the longitudinal axis 9.

The support plates 11 of both conveyors 10 and 12 respectively have a crowned, dome-shaped support surface 11*a* such that an optimal infeed surface for the underface 2''' of the sheet stack is provided, particularly in the twisted uprighting section 22. The dome-shaped support surface 11*a* is also very smooth such that the sheet stacks 2*c* . . . *f* are able to move toward the lateral support track plate 24 in accordance with their gravitational force in inclined transport sections while the sheet stacks 2*c, d* and, in particular, their individual bottom sheets, are transported to the pushers by the support plates 11 without being shifted in flat lying transport sections.

The uprighting device 1 is particularly suitable for uprighting sheet stacks consisting of very thin individual sheets. If the feed conveyors and discharge conveyors as well as the pusher couplings are redesigned accordingly, it would also be possible to carefully lay down such printed products. Analogously, the uprighting device 1 makes it possible to carefully upright or lay down other bound or unbound printed sheet stack products such as, for example, freshly bound books, brochures or book blocks, layered stacks with folded sheets of very thin paper, etc. It should also be understood that reference herein to the front, back, foot, head, top, and bottom is for convenience in describing the illustrated embodiment, and is not limiting with respect to the initial orientation of the product on the conveyor 17.

In alternative embodiments, both perpendicularly arranged support tracks may also be formed by freely rotatable rollers or cylinders. When processing less sensitive products, it is also possible to eliminate the specially designed support plates 11, in which case the printing products instead lie on the faces of the link plates.

The invention claimed is:

1. A device for transferring continuously transported bound or unbound printed sheet stack products having primary surfaces bordered by four edges, from an essentially flat lying position into an upright position or vice versa by a conveyor that is twisted about a longitudinal axis, wherein the improvement comprises:

a first transporter with pushers that bear on one edge to advance the printed products parallel to said axis during the transfer; and a second transporter with support elements, on which the printed products are at least partially supported on a primary surface during the transfer about said axis.

2. The device according to claim 1, wherein the support elements of the second transporter provide at least a narrow line of support, such that the support elements act upon the printed product in essentially one line of action with the respective pusher.

3. The device according to claim 1, wherein the first and the second transporters are driven in a synchronous fashion.

4. The device according to one claim 1, wherein the pushers of the first transporter are equidistantly spaced apart from one another and always guided substantially perpendicular to said primary surface of a respective printed product.

5. The device according to claim 1, including a conveyor table with two perpendicularly arranged support tracks that are respectively twisted about the longitudinal axis, wherein the pushers of the first transporter and the support elements of the second transporter protrude from the support track for contacting the printed products.

6. The device according to claim 5, wherein the support tracks are in the form of sliding surfaces.

7. The device according to claim 1, wherein a third transporter comprises support plates and is offset relative to the second transporter in parallel.

8. The device according to one of claim 7, wherein one of the second or third transporters is formed by providing the first transporter with support elements.

9. The device according to claim 1, wherein the transporters are formed by lateral sheet chains.

10. The device according to claim 9, wherein the support elements are formed by the link plates of the chains or by support plates mounted on the chain links.

11. The device according to claim 1, wherein the support elements have a support surface.

12. The device according to claim 11, wherein the support surface is smooth.

13. The device according to claim 11, wherein the support surface is round.

14. The device according to claim 1, wherein the transporters are arranged such that the pushers initially engage an edge of the printed product before said primary surfaces are reoriented by the support elements for initiating said transfer.

15. The device according to claim 14, wherein a belt conveyor that transports the printed products with a slower speed ($v_2$) along a transport plane is arranged upstream of the first and second transporter, and said transport plane of belt conveyor is penetrated by the first and second transporters from below.

* * * * *

UNITED STATES PATENT AND TRADEMARK OFFICE

CERTIFICATE OF CORRECTION

PATENT NO. : 7,367,442 B2
APPLICATION NO. : 11/402353
DATED : May 6, 2008
INVENTOR(S) : von Freden It is certified that error appears in the above-identified patent and that said Letters Patent is hereby corrected as shown below:

Column 6:

Line 35, delete "transporter" and replace with --transporters--.

Line 36, before "belt" insert --said--.

Signed and Sealed this

Nineteenth Day of August, 2008

JON W. DUDAS
*Director of the United States Patent and Trademark Office*